United States Patent [19]

Sarem

[11] 4,191,249

[45] Mar. 4, 1980

[54] REDUCING THE RELATIVE WATER/PETROLEUM MOVEMENT IN A PETROLEUM PRODUCING RESERVOIR

[75] Inventor: Amir M. Sarem, Yorba Linda, Calif.

[73] Assignee: Union Oil Company of California, Brea, Calif.

[21] Appl. No.: 961,091

[22] Filed: Nov. 16, 1978

[51] Int. Cl.² .......................................... E21B 33/138
[52] U.S. Cl. ................................. 166/244 C; 166/279; 166/294
[58] Field of Search ................... 166/244 C, 293, 294, 166/295, 279

[56] References Cited

U.S. PATENT DOCUMENTS

| | | | |
|---|---|---|---|
| 2,032,825 | 3/1936 | Ambrose | 166/294 X |
| 2,065,512 | 12/1936 | Cannon | 166/294 X |
| 2,411,793 | 11/1946 | Kennedy | 166/294 X |
| 2,776,713 | 1/1957 | Morgan et al. | 166/293 |
| 3,308,885 | 3/1967 | Sandiford | 166/295 |
| 3,330,345 | 7/1967 | Henderson et al. | 166/273 |
| 3,336,977 | 8/1967 | Amott | 166/274 |
| 3,483,925 | 12/1969 | Slyker | 166/279 |
| 3,721,295 | 3/1973 | Bott | 166/295 |
| 3,724,551 | 4/1973 | Troscinski et al. | 166/295 |
| 3,759,326 | 9/1973 | Christopher et al. | 166/275 |

FOREIGN PATENT DOCUMENTS

| | | | |
|---|---|---|---|
| 628351 | 10/1961 | Canada | 166/293 |
| 554396 | 5/1977 | U.S.S.R. | 166/294 |

*Primary Examiner*—Stephen J. Novosad
*Assistant Examiner*—George A. Suchfield
*Attorney, Agent, or Firm*—Dean Sandford; Gerald L. Floyd

[57] ABSTRACT

A method for reducing the relative water/petroleum movement in a reservoir wherein there is injected a slug of an oil containing both an oil-soluble thickening agent and a suspension of a solid particulate water-soluble thickening agent.

11 Claims, No Drawings

REDUCING THE RELATIVE WATER/PETROLEUM MOVEMENT IN A PETROLEUM PRODUCING RESERVOIR

BACKGROUND OF THE INVENTION

1. Field of the Invention

This invention relates to treating a subterranean reservoir penetrated by at least one well wherein the relative water/petroleum movement through the reservoir is reduced. More particularly, the invention relates to such a treatment wherein the flow of water through the water-producing zones of the reservoir is reduced while the flow of petroleum through the petrolume-producing zones remains substantially unchanged.

2. Description of the Prior Art

In producing petroleum from subterranean reservoirs penetrated by one or more wells, it is often desired, at some point in the productive life of the reservoir, to inject one or more treating fluids via one or more of the wells and subsequently produce the same well or wells. In such operations, it is often desired that reservoir petroleum be easily produced through the last-injected treating fluid but that the flow of a reservoir brine or a previously injected aqueous first treating fluid therethrough be restricted. Examples of such operations include treating the reservoir to reduce the water/oil ratio produced therefrom, treating a reservoir with a scale inhibitor, and the like.

It is known to inject into a reservoir various treating solutions containing a wide variety of either a water-soluble thickening agent or an oil-soluble thickening agent.

U.S. Pat. No. 3,336,977 to Amott describes a method for reducing the water-oil ratio of a production well wherein there is injected prior to the floodwater a suspension of a water-soluble viscosifier modifier in a non-solvent carrier liquid (crude oil). Examples of a viscosity modifier include water-soluble polymers such as modified starch, carboxymethylcellulose, polyacrylamide, partially hydrolyzed polyacrylamide and ethylene oxide polymers.

U.S. Pat. No. 3,483,925 to Slyker covers a squeeze treatment wherein there is sequentially injected into a formation a solution of a scale-inhibiting composition, an aqueous solution of a viscosity-increasing polymer such as polyacrylamide, and a further slug of the solution of a scale-inhibiting composition.

U.S. Pat. No. 3,721,295 to Bott discloses a process for reducing the water/oil ratio at a producing well involving injection into the well of a water-in-oil emulsion containing a dispersion of a finely divided water-soluble vinyl addition polymer (polyacrylamide). The emulsion concentrate can be diluted with an organic liquid such as crude oil. When the emulsion contacts formation water, it inverts releasing the polymer into solution. The resulting increased viscosity solution plugs channels in the formation.

U.S. Pat. No. 3,724,551 to Troscinski et al. is similar to the above patent except that the injection of emulsion-containing dispersed polymer is preceeded by injection of a slug of brine containing a water-soluble surfactant.

U.S. Pat. No. 3,330,345 to Henderson et al. involves a miscible drive process wherein there is injected into a formation: (1) a buffer slug of a hydrocarbon liquid containing a thickening agent, for example, polymethyl laurylate, polyalkyl styrene, polybutadiene and soaps of certain monocarboxylic acids; (2) an amphiphatic solvent such as a monohydroxy alcohol having from one to four carbon atoms per molecule; and (3) a scavenging fluid such as chemically treated water.

While the techniques disclosed in the above patents have certain advantages, need remains for further improvement in the control of water/petroleum ratios of producing wells and in prolonging the life of scale inhibitors injected into wells. It has not been previously known to carry out a well treatment wherein there is injected into a reservoir a treating agent containing both a water-soluble thickening agent and an oil-soluble thickening agent.

Accordingly, it is a principal object of this invention to provide a method for restricting the flow of an aqueous fluid through a reservoir.

It is another object of the invention to provide such a method wherein the water/petroleum ratio produced from a well is reduced.

It is still another object of the invention to provide such a method wherein the amount of water produced from a well is reduced without a substantial reduction in the amount of oil produced therefrom.

It is a further object of the invention to provide such a method wherein the life of a scale inhibitor injected into a reservoir is prolonged.

Other objects, advantages and features of the invention will be apparent from the following description.

SUMMARY OF THE INVENTION

Briefly, the invention involves a method for treating a subterranean reservoir penetrated by one or more wells wherein the flow of an aqueous fluid through the reservoir is reduced without a substantial reduction in the flow of petroleum therethrough by first injecting a slug of a petroleum liquid containing both an oil-soluble thickening agent and a suspension of a solid particulate water-soluble thickening agent, and subsequently producing the well. If the method is preceeded by injection into the reservoir of an aqueous solution of a scale inhibitor, the inhibitor is produced from the reservoir at a slower rate than normal.

DETAILED DESCRIPTION OF THE INVENTION

Relatively low viscosity brine generally moves more readily through a reservoir containing both oil and brine than does relatively high viscosity oil. In water drive reservoirs, water is almost unavoidably produced along with the petroleum. Normally, as production of a well continues, the degree of water saturation of the reservoir increase and the relative oil permeability is reduced. Thus, a well tends to produce more and more water and less and less petroleum.

In wells with scale problems, it is common to inject into the surrounding reservoir a scale inhibitor contained in an aqueous medium. When such wells are returned to production, it is desired that the inhibitor mix with reservoir fluids and be produced back at a slow rate over an extended period of time. In fact, the inhibitor is often produced back at a fast rate and is soon depleted from the reservoir.

In each of the above instances, i.e., producing a water drive reservoir or producing a reservoir containing a previously injected scale inhibitor, it would be advantageous to carry out a further or second treatment on the reservoir which would tend to promote a reduction in the water/oil mobility therein. The second treating fluid should be capable of effectively displacing the reservoir fluids or previously injected fluids away from the immediate vicinity of the well in a uniform manner. Thus, this second treating fluid or displacement fluid should itself be a low mobility fluid. This is achieved by employing as the second treating fluid an oil containing, in part, an oil-soluble thickening agent.

When the well is placed on production following injection of the second treating fluid, the reservoir fluids, which can be petroleum from petroleum-containing zones and/or brine from water containing zones, and any previously injected first treating fluid attempt to displace the second treating fluid back toward the well or finger through the same. In order to encourage passage of petroleum through the second treating fluid and into the well, and to discourage passage of brine or other aqueous fluid therethrough, there is incorporated into the second treating fluid an additional ingredient comprising a dispersion of a solid particulate water-soluble thickening agent. Thus, when brine or other aqueous fluid mixes with the second treating fluid, the water-soluble thickening agent increases the viscosity of the resulting mixture and tends to restrict further flow of the aqueous media therethrough. When reservoir petroleum mixes with the second treating fluid, it does not effect the viscosity thereof or decreases the viscosity slightly due to the dilution effect. Therefore, reservoir petroleum continues to displace the second treating fluid or fingers therethrough. The overall effect is that the so-treated well produces less water and more petroleum.

The second treating fluid which controls the water/petroleum ratio in the process of this invention is a petroleum base liquid, such as crude oil or a refined petroleum material, for example kerosine, diesel oil and the like. The amount of the second treating fluid to be injected depends on the nature of the reservoir which is to be treated, the particular reservoir fluids and/or previously injected treating fluids which will be contacted and the reservoir temperature and pressure conditions. Generally the second treating fluid is injected in a slug of about 10 to 100 gallons per foot of reservoir treated. Additional slugs of a similar size can be employed later in the productive life of the well.

The oil-soluble thickening agent component of the second treating fluid can be any of the well known oil thickeners including polymethyl laurylate, polyalkyl styrene, polybutadiene, polyisobutylene, the bivalent or trivalent metallic soaps of monocarboxylic acids having 14 or more carbon atoms per molecule and powdered colloidal silicas which are fire dried fumed silicas having a surface area between 200 and 480 square meters per gram. The molecular weight of the above-described polymers which serve as oil thickeners is preferably in the range of about 50,000 to 1,000,000. The amount of oil-soluble thickening agent to be used will vary depending on which petroleum-base liquid is used and its initial viscosity as well as the particular thickening agent employed. Generally, enough thickening agent is used to increase the viscosity of the petroleum base liquid about fourfold at reservoir temperature and pressure. Such a viscosity increase is achieved by using about 0.2 to 2 percent by weight thickening agent.

The water-soluble thickening agent component of the second treating fluid can be any of the well known water thickeners including water-soluble polymers such as polyacrylamide, partially hydrolyzed polyacrylamide, polyacrylic acid, polyvinyl alcohol, polyvinyl pyrrolidone, polystyrene sulfonate, polyethylene oxide and a heteropolysaccharide produced by bacteria of the genus Xanthomonas; cellulose derivatives such as methylcellulose, ethylcellulose, carboxymethylcellulose and carboxymethylhydroxyethylcellulose; an alkaline alkali metal silicate having a molar ratio of $M_2O/SiO_2$ of 1 or above wherein M is an alkali metal atom; and natural gums such as guar, xanthan, karaya and the like. The molecular weight of the above-described water-soluble polymers can vary over a wide range, e.g., 10,000 to 25,000,000. The preferred polymers have a molecular weight in excess of 1,000,000. The preferred partially hydrolyzed polyacrylamides have between about 12 to about 67 percent of the carboxamide groups hydrolyzed to carboxyl groups. The amount of water-soluble thickening agent employed can vary depending on such factors as the nature and quantity of reservoir fluids and/or previously injected fluids which will be contacted in the reservoir by the second treating fluid, the downhole well conditions of temperature and pressure and the particular thickening agent selected. Generally about 0.2 to 2 percent by weight water-soluble thickening agent in finely divided particulate form is suspended in the second treating fluid.

The method of this invention can be carried out on a production well to control the produced water/oil ratio. The method can also be carried out on a production well into which a scale inhibitor composition has been injected previously.

Scales which tend to form in the reservoir near a well and in the well itself or other fluid handling equipment include calcium sulfate or gypsum, barium sulfate, calcium carbonate, strontium carbonate, iron oxide, iron sulfide, magnesium sulfate and the like. Scale inhibitors are materials which are injected into the well and/or the reservoir around the well. When the well is returned to production, the inhibitor mixes with the produced fluids, is slowly produced out of the well and retards or prevents the formation of scale. The scale inhibitor can be any one of a number of well known scale inhibitors including: water-soluble metal salts of relatively low molecular weight hydrolyzed polyacrylamides, wherein the metal is a polyvalent cation such as $Ca^{++}$, $Zn^{++}$, $Pb^{++}$, $Fe^{+++}$, $Cr^{+++}$ and $Al^{+++}$ and the the molecular weight range is about 5,000 to 50,000; a sulfonated alkali lignin having a degree of sulfonation of about 0.8 to 4.0; a polyamino polycarboxylic compound such as the tetrasodium salt of ethylenediaminetetraacetic acid; polyphosphate glasses such as alkali metal calcium polyphosphate, alkali metal magnesium polyphosphate and alkali metal calcium magnesium polyphosphate; organic phosphates such as 1-hydroxy, 1,1-diphosphonic acid ethane and ethylenediamine tetramethylene phosphonic acid; phosphate mixed esters of hydroxy amines containing less than 8 carbon atoms in hydrocarbon groups attached to the amino nitrogen and hydroxy hydrocarbons containing at least 6 carbon atoms in a hydrocarbon group; and various other inorganic or organic phosphate materials such as a phosphoric acid, e.g., orthophosphoric acid. The scale inhibitors are usually injected as an aqueous solution or in suspension in an aqueous medium if they have limited water solubility. Usually a concentration of about 0.5 to 5 percent by weight scale inhibitor in an aqueous medium is used. The aqueous medium can be either fresh water or brine. A slug of about 2 to 20 gallons per foot aqueous solution or dispersion of the scale inhibitor can be used.

A comparison of the method of this invention and two prior art methods is given in the following examples which are presented by way of illustration and are not intended as limiting the spirit and scope of the invention as defined by the appended claims.

EXAMPLE 1

This test illustrates a prior art method of injection of a scale inhibitor solution and subsequent production of the well without further treatment. A laboratory model representative of a thin section of a reservoir is constructed from two superimposed one-inch thick, parallel, pie-shaped transparent plastic plates spaced 0.45 centimeters apart. Each plate defines a 22.5° arc of a circle having a radius of 22 inches. A single ⅛-inch diameter hole containing a plug with a 1/32-inch wide slot therein is provided near the apex of one of the plates and four ⅛-inch diameter holes having plugs with similar slots are equidistantly spaced from the apex near the arcuate end of this plate to provide fluid passage into and out of the cavity between the plates. The cavity is closely packed with 433 grams of 50 to 60 mesh glass beads. The two plates are sealed together at their outer edges. The pore volume of the model with the glass beads in place is 108 cubic centimeters.

Step 1—The model is purged by flowing carbon dioxide through the cavity to displace the air. The direction of flow is into the single opening near the apex of the model and out of the four openings near the opposite end of the model.

Step 2—The model is flooded with a de-gassed 3 percent by weight aqueous solution of sodium chloride brine at a flow rate of 5.2 milliliters per minute and an inlet pressure of 14.7 centimeters of mercury. The permeability of the model is calculated as 4,572 millidarcies.

Step 3—Mineral oil is injected into the model until the produced water/oil ratio approaches 0.1.

Step 4—A 0.1 pore volume slug of an aqueous solution of 98.9 milligrams orthophosphoric acid scale inhibitor in 9.89 milliliters water is injected.

Step 5—A 0.2 pore volume slug of mineral oil (21.6 milliliters) is injected to displace the scale inhibitor solution out into the reservoir and away from the immediate vicinity of the point of injection.

Step 6—The direction of flow through the model is reversed, a 3 percent by weight aqueous solution of sodium chloride brine is injected via two of the openings near the arcuate end of the model, simultaneously mineral oil is injected via the other two openings near the arcuate end of the model, and fluids are produced via the single opening near the apex of the model. The rate of fluid injection is 0.25 milliliters per minute.

Step 7—As the fluids are produced, they are collected, the water/oil ratio periodically determined and the cumulative amount of orthophosphoric acid produced back out of the model analytically determined. The results of this test are reported in the Table.

EXAMPLE 2

This test illustrates another prior art method of injection of a scale inhibitor wherein the inhibitor is followed by the injection of a thickened aqueous solution in an attempt to retard the subsequent rate of production of the inhibitor back out of the well. A test is made similar to that described in Example 1 except that following the injection of the scale inhibitor solution in Step 4, there is injected as Step 4a a 0.02 pore volume slug, 2.2 milliliters, of a polymer-thickened brine solution consisting of a mixture of 1.08 milliliters of a 3 percent by weight sodium chloride brine and 1.08 milliliters of a 0.1 percent by weight aqueous solution of Pusher 700*. The results of this test are reported in the Table.

*A polyacrylamide hydrolyzed to the extent of 15 to 45 percent marketed by The Dow Chemical Company.

EXAMPLE 3

This test illustrates the method of this invention wherein the injection of a scale inhibitor solution is followed by injection of a thickened oil containing a suspension of finely divided particulate water-soluble thickener. Another test similar to that described in Example 1 is made, except that following the injection of the scale inhibitor solution in Step 4, there is injected as Step 4a a 0.096 volume slug of a solution of 10.4 milliliters of mineral oil containing 1 percent by weight Vistanex L-200** and 0.1 percent by weight powdered Pusher 700. The results of this test are reported in the Table.

**Polyisolbutylene marketed by Enjay Chemical Company.

TABLE

| Example Number | Cumulative Injection (50% by vol. mineral oil and 50% by vol. 3% by wt. NaCl brine) (mls.) | Cumulative Production | | Water/Oil Ratio |
| --- | --- | --- | --- | --- |
| | | Brine (mls.) | Orthophosphoric Acid (mgs.) | |
| 1 | 6.9 | — | — | — |
| 1 | 13.9 | 0.54 | 4.6 | 0.286 |
| 1 | 20.5 | 1.8 | 12.5 | 0.227 |
| 1 | 27.2 | 2.7 | 17.4 | 0.234 |
| 1 | 33.7 | 3.4 | 19.0 | 0.174 |
| 1 | 41.2 | 3.9 | 23.5 | 0.125 |
| 1 | 47.7 | 5.3 | 28.2 | 0.286 |
| 1 | 54.3 | 7.8 | 40.6 | 0.688 |
| 1 | 61.5 | 12.0 | 52.8 | 1.90 |
| 1 | 68.1 | 16.3 | 54.7 | 2.37 |
| 1 | 74.7 | 20.7 | 56.5 | 1.70 |
| 1 | 81.0 | 25.3 | 57.3 | 3.03 |
| 2 | 6.3 | 1.1 | 1.3 | 23.0 |
| 2 | 13.0 | 2.9 | 5.6 | 0.65 |
| 2 | 20.1 | 5.4 | 14.1 | 0.55 |
| 2 | 26.9 | 7.7 | 22.1 | 0.56 |
| 2 | 35.3 | 10.8 | 32.6 | 0.59 |
| 2 | 39.5 | 12.4 | 37.1 | 0.56 |
| 2 | 48.0 | 16.2 | 45.4 | 1.00 |
| 2 | 56.4 | 21.0 | 49.3 | 1.80 |

TABLE-continued

| Example Number | Cumulative Injection (50% by vol. mineral oil and 50% by vol. 3% by wt. NaCl brine) (mls.) | Cumulative Production Brine (mls.) | Cumulative Production Orthophosphoric Acid (mgs.) | Water/Oil Ratio |
|---|---|---|---|---|
| 2 | 60.6 | 23.6 | 50.2 | 1.80 |
| 2 | 64.8 | 26.3 | 50.9 | 2.10 |
| 2 | 69.0 | 29.2 | 51.5 | 2.50 |
| 2 | 73.5 | 32.2 | 51.8 | 2.2 |
| 3 | 6.4 | 0.09 | — | 0.83 |
| 3 | 11.9 | 1.09 | 4.9 | 0.227 |
| 3 | 20.0 | 2.3 | 9.9 | 0.170 |
| 3 | 28.2 | 4.0 | 16.0 | 0.300 |
| 3 | 32.3 | 5.1 | 19.8 | 0.409 |
| 3 | 40.6 | 8.0 | 26.9 | 0.651 |
| 3 | 48.9 | 11.5 | 31.2 | 1.000 |
| 3 | 57.2 | 15.5 | 32.9 | 1.197 |
| 3 | 65.6 | 19.9 | 33.8 | 1.33 |
| 3 | 73.9 | 24.7 | 34.6 | 1.76 |
| 3 | 85.9 | 42.1 | 35.2 | 2.52 |
| 3 | 97.2 | 63.6 | 35.6 | 3.33 |
| 3 | 101.6 | 72.4 | 35.7 | 4.00 |

A comparison of the above tests shows that the prior art Example 1 wherein no thickening agent was injected behind the scale inhibitor composition, the produced water/oil ratio was relatively high and the produced water contained a relatively high amount of scale inhibitor. In prior art Example 2 wherein the injection of scale inhibitor composition was followed by a slug of thickened water, the produced water/oil ratio remains high whereas the amount of scale inhibitor produced back is somewhat reduced. In Example 3 carried out according to the method of this invention, the produced water/oil ratio is lower than that of either prior art method at comparable amounts of fluid injected. The amount of scale inhibitor in the produced fluid is remarkably lower than with either of the two prior art methods. This means that with the method of this invention the scale inhibitor will remain in the reservoir and be available to protect against scale deposition over a longer period of time.

EXAMPLE 4

A well which produces both oil and water slowly declines in production due to the formation of calcium carbonate scale in the reservoir in the vicinity of the well and in the well conduits. The well is next acidized to remove the scale. In order to retard further scale deposition, there is injected into the reservoir surrounding the well 4 gallons per foot of an aqueous solution containing 2 percent by weight of the tetrasodium salt of ethylenediamine tetraacetic acid. In order that the scale inhibitor be produced back out of the reservoir at a slow rate when the well is put back on production, there is next injected into the reservoir 30 gallons per foot of lease crude oil containing 1 percent by weight Oppanol B-200* oil-soluble thickener and 1 percent by weight Cab-O-Sil** water-soluble thickener. A 50 gallons per foot slug of lease oil is injected to displace the previously injected fluids out into the reservoir. The well is then returned to production. Production of oil is increased moderately and production of water is decreased substantially.

*A polyisobutylene marketed by BASF Corporation.
**A colloidal silica having a particle size of about 200 square meters per gram marketed by Cabot Corporation.

EXAMPLE 5

During the producing life of a well, the water/oil ratio increases requiring that an increasing volume of fluids be produced to maintain the same volume of oil production. The increasing amount of water produced creates additional problems of disposal. In an attempt to reduce the produced water/oil ratio, the producing interval of the well is treated by injecting therein a slug of 50 gallons per foot of producing interval of lease crude containing 0.75 percent by weight aluminum stearate oil-soluble thickener and a suspension of 0.2 percent by weight Enjay B-9702*** water-soluble thickener. This composition is displaced out into the reservoir by injecting into the well a slug of 20 gallons per foot of producing interval of lease crude. The well is then returned to production. At the same production rate as used before the treatment, the volume of oil produced increases substantially and the volume of water produced decreases sharply. Thus, the produced water/oil ratio is reduced as desired.

***A heteropolysaccharide produced by bacteria of the genus Xanthomonas marketed by Enjay Chemical Company.

While particular embodiments of the invention have been described, it will be understood, of course, that the invention is not limited thereto since many modifications can be made and it is intended to incude within the invention such modifications as are within the scope of the claims.

The invention having thus been described, I claim:

1. A method fo reducing the relative water/petroleum movement in a petroleum-containing water drive reservoir penetrated by one or more wells comprising:
   (a) injecting into the reservoir a slug of an oil containing both an oil-soluble thickening agent and a solid particulate water-soluble thickening agent, and
   (b) producing the well.

2. The method of claim 1 wherein the method is preceded by the injection of a slug of an aqueous composition containing a scale inhibitor.

3. The method of claim 2 wherein the scale inhibitor is selected from the group consisting of a water-soluble polyvalent metal salt of a hydrolyzed polyacrylamide having a molecular weight of about 5,000 to 50,000; a sulfonated alkali lignin having a degree of sulfonation of about 0.8 to 4.0; a polyamino polycarboxylic compound; a polyphosphate glass; an organic phosphate; a phosphate mixed ester of hydroxy amines containing less than 8 carbon atoms in hydrocarbon groups attached to the amino nitrogen and hydroxy hydrocarbons containing at least 6 carbon atoms in a hydrocarbon group; and a phosphoric acid.

4. The method of claim 1 wherein the oil-soluble thickening agent is selected from the group consisting of polymethyl laurylate, polyalkyl styrene, polybutadiene, polyisobutylene, a bivalent or trivalent metallic soap of a monocarboxylic acid having 14 or more carbon atoms per molecule and, a powdered colloidal silica.

5. The method of claim 1 wherein the oil-soluble thickening agent is present in a concentration of about 0.2 to 2 percent by weight.

6. The method of claim 1 wherein the water-soluble thickening agent is selected from the group consisting of water-soluble polymers, cellulose derivatives, alkaline alkali metal silicates having a molar ratio of $M_2O/SiO_2$ of 1 or above wherein M is an alkali metal atom, and natural gums.

7. The method of claim 6 wherein the water-soluble thickening agent is partially hydrolyzed polyacrylamide.

8. The method of claim 1 wherein the water-soluble thickening agent is present in a concentration of about 0.2 to 2 percent by weight.

9. A method for reducing the water/oil ratio produced from a well completed in an oil-containing water drive reservoir penetrated by one or more wells comprising:
(a) injecting into the reservoir a slug of an oil containing both an oil-soluble thickening agent selected from the group consisting of polymethyl laurylate, polyalkyl styrene, polybutadiene, polyisobutylene, a bivalent or trivalent metallic soap of a monocarboxylic acid having 14 or more carbon atoms, a powdered colloidal silica and a solid particulate water-soluble thickening agent selected from the group consisting of water-soluble polymers, cellulose derivatives, alkaline alkali metal silicates having a molar ratio of $M_2O/SiO_2$ of 1 or above wherein M is an alkali metal atom, and natural gums, and
(b) producing the well.

10. A method for prolonging the life of a scale inhibitor injected into an oil-containing water drive reservoir comprising:
(a) injecting a slug of an aqueous composition containing a scale inhibitor selected from the group consisting of a water-insoluble polyvalent metal salt of a hydrolyzed polyacrylamide having a molecular weight of about 5,000 to 50,000; a sulfonated alkali lignin having a degree of sulfonation of about 0.8 to 4.0; a polyamino polycarboxylic compound; a polyphosphate glass; an organic phosphate; a phosphate mixed ester of hydroxy amines containing less than 8 carbon atoms in hydrocarbon groups attached to the amino nitrogen and hydroxy hydrocarbons containing at least 6 carbon atoms in a hydrocarbon group; and a phosphoric acid,
(b) injecting a slug of an oil containing both an oil-soluble thickening agent selected from the group consisting of polymethyl laurylate, polyalkyl styrene, polybutadiene, polyisobutylene, a bivalent or trivalent metallic soap of a monocarboxylic acid and a solid particulate water-soluble thickening agent selected from the group consisting of water-soluble polymers, cellulose derivatives, alkaline alkali metal silicates having a molar ratio of $M_2O/SiO_2$ of 1 or above wherein M is an alkali metal atom, and natural gums, and
(c) producing the well.

11. The method of claim 10 wherein the scale inhibitor is present in a concentration of about 0.5 to 5 percent by weight.

* * * * *

UNITED STATES PATENT OFFICE
CERTIFICATE OF CORRECTION

Patent No. 4,191,249          Dated March 4, 1980

Inventor(s) Amir M. Sarem

It is certified that error appears in the above-identified patent and that said Letters Patent are hereby corrected as shown below:

Claim 3, line 3, the word "water-soluble" should read — "water-insoluble" —

*Signed and Sealed this*

*Seventeenth* Day of *June 1980*

[SEAL]

Attest:

SIDNEY A. DIAMOND

*Attesting Officer*           *Commissioner of Patents and Trademarks*